US012810143B2

(12) United States Patent
Ralph et al.

(10) Patent No.: US 12,810,143 B2
(45) Date of Patent: Nov. 24, 2026

(54) CALIBRATION OF SYNTHETIC DATA WITH REMOTE PROFILES

(71) Applicant: FAIR ISAAC CORPORATION, Roseville, MN (US)

(72) Inventors: Christopher Allan Ralph, Toronto (CA); Gerald Fahner, Austin, TX (US)

(73) Assignee: Fair Isaac Corporation, Minneapolis, MN (US)

( * ) Notice: Subject to any disclaimer, the term of this patent is extended or adjusted under 35 U.S.C. 154(b) by 1146 days.

(21) Appl. No.: 17/739,108

(22) Filed: May 7, 2022

(65) Prior Publication Data

US 2023/0359883 A1 Nov. 9, 2023

(51) Int. Cl.
*G06N 3/08* (2023.01)
*G06F 18/2113* (2023.01)
*G06N 3/04* (2023.01)

(52) U.S. Cl.
CPC ........... *G06N 3/08* (2013.01); *G06F 18/2113* (2023.01); *G06N 3/04* (2013.01)

(58) Field of Classification Search
CPC .......... G06N 3/08; G06N 3/04; G06N 3/0475; G06N 3/0455; G06F 18/2113; G06F 21/6254
See application file for complete search history.

(56) References Cited

U.S. PATENT DOCUMENTS

| | | | | |
|---|---|---|---|---|
| 11,030,526 | B1 * | 6/2021 | Goodsitt | G06N 20/10 |
| 2018/0165475 | A1 * | 6/2018 | Veeramachaneni | G06F 21/6254 |
| 2020/0151557 | A1 * | 5/2020 | Nezhadarya | G06N 3/0464 |
| 2023/0088561 | A1 * | 3/2023 | Ickin | G06N 3/098 706/12 |

* cited by examiner

*Primary Examiner* — Sarah Su
*Assistant Examiner* — Kelah Janae McFarland-Barnes
(74) *Attorney, Agent, or Firm* — Mintz, Levin, Cohn, Ferris, Glovsky and Popeo, P.C.; F. Jason Far-hadian, Esq.

(57) ABSTRACT

A method, a system, and a computer program product for calibrating synthetic data. A synthetic data is generated based on one or more source data using one or more generative models. The generative models are used to generate a latent space based on one or more source data. One or more latent space vectors associated with the generated latent space are determined in accordance with one or more data profiles associated with the one or more source data. The latent space vectors associated with the generated latent space are sampled. Based on the sampling, an optimized synthetic data is generated by comparing the sampled latent space vectors with one or more baseline data associated with one or more data profiles.

20 Claims, 5 Drawing Sheets

CALIBRATION OF SYNTHETIC DATA WITH REMOTE PROFILES

BACKGROUND

Information about various entities, companies, individuals, etc. including, but not limited to personal information, medical information, financial information, such as, transactions, amount of assets, outstanding debts, purchases, credit scores, can be sensitive. For example, information about an entity's purchases can reveal a great deal about that entity's history, such as places visited, entity's contacts, products bought/used, entity's activities/habits, etc. Unauthorized access to such information may result in substantial harm and/or loss to that entity through commission of fraud, identity theft, etc. An alternative to sharing data in support of domain-specific analysis, such as, statistical modeling and/or analytic strategy development is to make modifications to a known dataset such that the modified version closely matches the multivariate structure of a remote (i.e., unshared) target dataset through a calibration process leveraging generative models and remote profiles of key variables. This process ensures full data security by providing mechanisms to remotely "tune" a known dataset, thus, eliminating the need to share the source data directly.

SUMMARY

In some implementations, the current subject matter relates to a computer-implemented method for calibrating synthetic data. The method may include generating, using at least one processor, a synthetic data based on one or more source data using one or more generative models, where one or more generative models may be used to generate a latent space based on one or more source data, determining one or more latent space vectors associated with the generated latent space in accordance with one or more data profiles associated with one or more source data, sampling one or more latent space vectors associated with the generated latent space, and generating, based on the sampling, an optimized synthetic data by comparing sampled one or more latent space vectors with one or more baseline data associated with one or more data profiles.

In some implementations, the current subject matter can include one or more of the following optional features. The generative model may be an autoencoder. The optimized synthetic data may include one or more distributional properties associated with one or more data profiles. The optimized synthetic data may include one or more properties configured to match one or more properties of one or more source data.

In some implementations, the processor may be configured to be located remotely from a storage location storing one or more source data (and/or at the same location).

In some implementations, the sampling may include sampling, using one or more data profiles, one or more latent space vectors associated with the generated latent space. One or more latent space vectors may be associated with one or more weighted selection probabilities. The sampling may be performed using one or more weighted selection probabilities.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
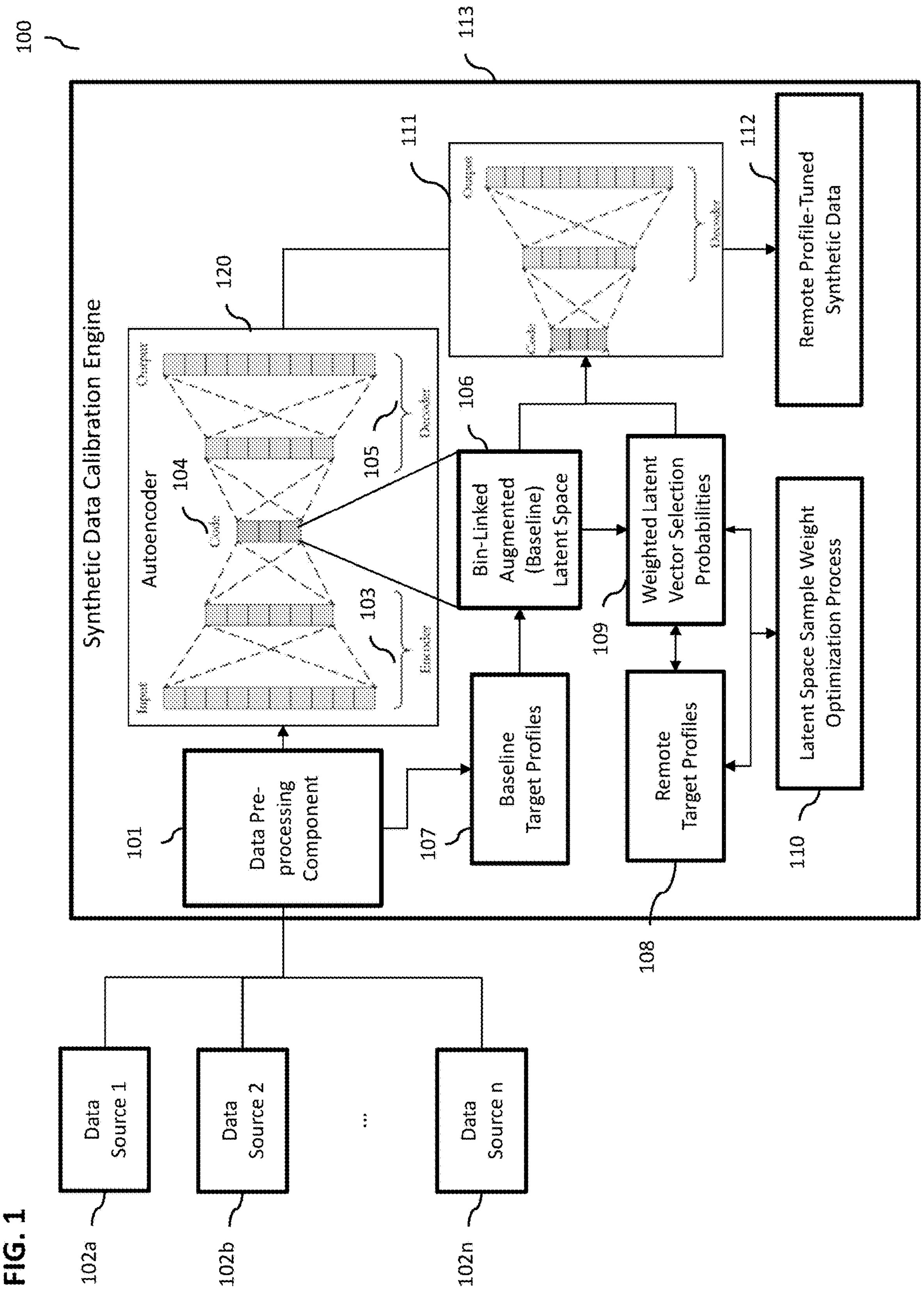
FIG. 1 illustrates an exemplary system for executing replication of one or more input source data using a generative model, and a tuning process that optimizes weighted selection probabilities associated with the latent space vectors from that model to generate remotely-tuned synthetic data, according to some implementations of the current subject matter.

In some implementations, the current subject matter may be configured to provide an efficient solution for generating calibrated synthetic data through structure-preserving autoencoders with latent space augmentation, and in particular, calibrating synthetic data generated using the process of latent space augmentation with one or more remote data profiles.

Synthetic data refers to any production data applicable to a particular situation that is not obtained by direct measurement. It may also be information that is persistently stored and used to conduct various business processes. Synthetic data may also refer to an ability to keep data confidential, whereby instead of actual data distribution, synthetic data is generated and released. Typically, data that may be generated using a computer simulation may be referred to as synthetic data. Synthetic data may be generated by population models, also known as generative models. It may retain relevant statistical properties of the original data, where individual synthetic records may be unidentifiable and/or anonymous (e.g., synthetic records may not be traceable to a specific original record and/or a specific real person). Calibrated synthetic data may be used to perform analysis suitable for a remote source without compromising the confidentiality of data (e.g., human information, such as, name, home address, IP address, telephone number, social security number, credit card number). This process may eliminate the need for sharing of granular data while preserving an ability to provide access to meaningful multivariate patterns.

In some implementations, the current subject matter provides a data calibration process that may be configured to transform sensitive source data into secure synthetic data by optimizing one or more trade-offs between synthetic data fidelity and remote profile details in the form of bin count distributions for key variables. Synthetic data fidelity may be defined as a high retention of information content, measured by predictive power relative to real data.

In some implementations, to de-identify a source data dataset (e.g., arranged in columns and rows), while balancing synthetic data fidelity and security, the current subject matter may be configured to make it impossible to trace a row of data from a 'calibrated' version of the data (e.g., synthetic data) back to any individual row in the original remote source data while retaining the detailed multivariate structure of the original remote data, such that analysis of the refined version of data may be used to generate results that are very close to the same analysis on the original source. To do so, the current subject matter may be configured to implement an optimized sample weight tuning process applied to the latent space vectors of a trained neural network-based generative model, e.g., an autoencoder. The autoencoder may be an unsupervised learning model and may include an input layer (e.g., an encoder part), an output layer (e.g., a decoder part), and a hidden layer that connects the input and output layers.

The encoder part of the autoencoder may be configured to reduce dimensionality of the original input data (e.g., which may be scaled and/or pre-processed) to generate a latent space. The latent space may then be used as an input to the decoder part of the autoencoder. The decoder part may be configured to generate synthetic data that may be configured to closely match to the original source data. The current subject matter may be configured to execute a refinement process in the latent space of the autoencoder to refine the reduced-dimension data, which may then be re-run through the decoder part of the autoencoder to generate synthetic data.

The current subject matter data calibration process may be advantageous in that it may be configured to overcome data security issues that prevent sharing of real data by generating synthetic data that approximates a data structure of remote source data, e.g., a table with columns and rows, without including any original data rows.

In some implementations, the current subject matter may be further configured to generate synthetic data using the latent space augmentation processes discussed herein, where the synthetic data may be representative of a data stored ("target data" or "remote target data") in the remote data source, and to calibrate such generated synthetic data using remote data profile information to create a "match" between the synthetic data and the data in the remote data source. The calibration may be executed using an optimization procedure that may determine one or more best weighted selection probabilities on the latent space vectors obtained using the autoencoder generative model (as discussed herein), such that the synthetic data generated by the autoencoder has distributional properties that closely mirror the profiles of the remote target data. As a result, a realistic synthetic dataset suitable for analytics may be generated remotely.

As part of the technical advantages of the current subject matter, an ability to calibrate a remote data source using an autoencoder generative model may be configured to make it much easier to generate useful analytic solutions by effectively eliminating a need for physical file transfers. This may provide an ability to perform various data analysis when transfer of data is not possible and/or prohibited, for example, due to security and/or policy limitations of organizations that store such data.

FIG. 1 illustrates an exemplary system 100 for executing refining of input source data to generate calibrated and synthetic data, according to some implementations of the current subject matter. The system 100 may include one or more data sources 102 (a, b . . . n), which may be one or more remote data source, and a synthetic data calibration engine 113 that may be configured to generate one or more remote profiled-tuned (calibrated) synthetic data 112. The data sources 102 may be located remotely from the data calibration engine 113 and may store data ("target data" and/or "remote target data") that may need to be profiled and/or analyzed without being transferred to the engine 113.

The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

The engine 113 may be configured to execute one or more functions associated with synthesizing and calibrating data received from one or more data sources 102. The synthesizing/calibration of data from data source may be performed in response to a query that may be externally received from one or more users of the system 100 (not shown in FIG. 1). Such users may include any users, user devices, entities, software applications, functionalities, computers, and/or any other type of users, device, etc.

The source(s) of data 102 may be configured to store and/or provide various data, such as for example, transactional data, time-series data, tradeline data, snapshot data, and/or any other data, and/or any combinations thereof. The data may be arranged in one or more tables, one or more rows, one or more columns, and/or in any other desired way.

The engine 113 may be further configured to include a data pre-processing component 101, one or more baseline target profiles component 107, one or more remote target profiles component 108, one or more weighted latent vector selection probabilities component 109, one or more latent space sample weight optimization process component 110, and an autoencoder component 120. The autoencoder component 120 may be configured as a neural network and may include an encoder component 103, a coding component 104, and a decoder component 105. The data refinery engine 113 may also include a bin-linked augmented (e.g., baseline) latent space component 106 that may be configured to augment processing in the coding component 104 and a decoder component 105 that may be configured to receive output of the latent space augmentation component 106 for generation of the output data 112. In some exemplary implementations, the decoder component 111 may be the same as the decoder component 105, whereby augmented data resulting from the bin-linked augmented (baseline) latent space component 106 is combined with the weighted latent vector selection probabilities 109 and re-run through the decoder component 111 to produce the final calibrated synthetic data.

In some exemplary implementations, the data received from the data sources 102 may, optionally, be pre-processed by the data pre-processing component 101 of the data calibration engine 113. The pre-processing performed by the component 101 may be configured to prepare the data from the data sources for processing through the encoder component 103. For example, pre-processing may be performed using one or more classes, e.g., "LowerCase" (correcting lower case problems in the source data), "UpperCase" (correcting upper case problems in the source data), "NumericMissingValue" (correcting missing numerical values in the source data), "NumericMissingMethod" (correcting missing numerical methods in the source data), "CharMissingValue" (correcting missing string values in the source data), "CharMissingMethod" (correcting missing string methods in the source data), "DropVariables" (correcting dropped variables in the source data), "BoxOutlierTreatment" (addressing outlier data values in the source data), "CharEncoder" (addressing encoding issues in the source data), "LowVarianceMethod" (addressing low variance and/or rescaling problems in the source data), and/or any others. Once the problems are addressed, the pre-processed data may be supplied to the autoencoder component 120.

As stated above, the autoencoder component 120 may include the encoder component 103 that may receive the pre-processed data from the component 101 and may reduce dimensionality of the source data to generate a latent space as output. The output of the encoder component 103 may be processed by the coding portion 104 of the autoencoder component 120. The output of the coding portions 104 may serve as an input to the decoder component 105 of the autoencoder component 120. The output of the decoder component 105 may include synthetic data that may correspond to the original source data received from one or more sources of data 102.

In some implementations, the coding portion 104 may be configured to execute an augmentation of the latent space using the bin-linked augmented (e.g., baseline) latent space augmentation component 106. Augmentation of the latent space may be executed during a first processing of the source data and/or one or more of the subsequent processing of the synthetic data that may be generated by the autoencoder's decoder component 105. Either the decoder component 105 and/or the decoder component 111 may be configured to process data that has been augmented by the component 106. Moreover, one or more target data profiles (e.g., profiles describing data that may be contained in one or more data sources 102) may be provided to the component 106 from the remote target profiles component 108 for the purposes of calibrating synthetic data, as will be discussed below with regard to FIG. 2.

Figure 2:
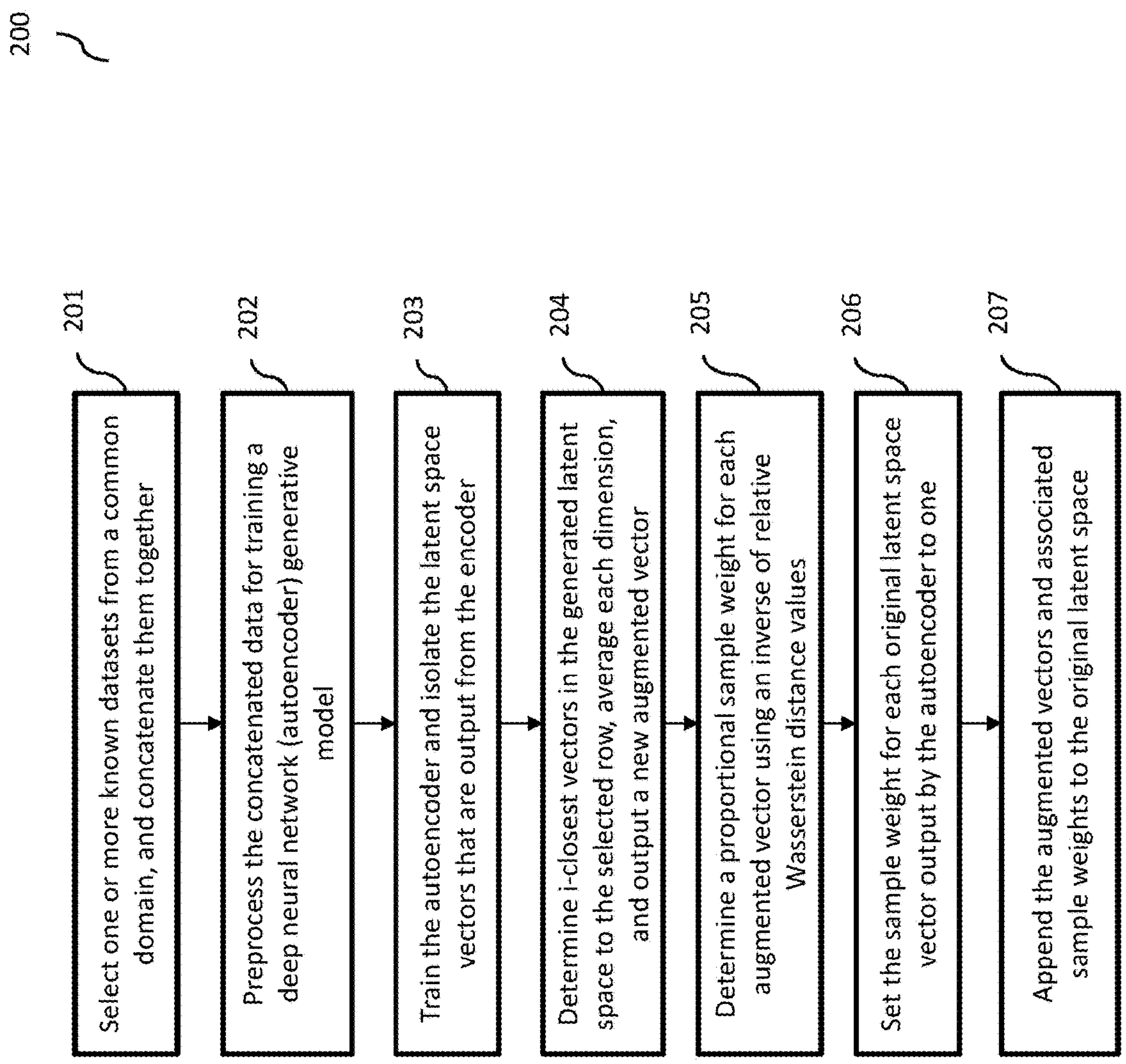
FIG. 2 illustrates an exemplary generative model and latent space augmentation process to generate a bin-linked augmented (e.g., baseline) latent space component shown in FIG. 1, according to some implementations of the current subject matter.

FIG. 2 illustrates an exemplary data augmentation process 200 that may be executed by the bin-linked augmented (e.g., baseline) latent space component 106, as shown in FIG. 1, according to some implementations of the current subject matter. At 201, the component 106 may configured to select all of the rows in the latent space that need to be refined. For example, the component 106 may be configured to select one or more known datasets from a common domain. The selected datasets may also be concatenated together. At 203, the concatenated data may be pre-processed to make it suitable for training a deep neural network generative model, e.g., autoencoder 120. The component 106 may also select a value k (e.g., k=5) as an input to the refinement process. Here, the component 106 may also determine and/or select identifiability threshold (e.g., 0-100%, where 0% corresponds to synthetic data being least identifiable with the source data; and 100% corresponds to synthetic data being most identifiable with the source data). The autoencoder 120 may be trained. Additionally, one or more latent space vectors, which represent output of the encoder 103 may be isolated, at 203.

At 204, for each selected row in the latent space, i.e., i=1 . . . k, the component 106 may be configured to determine the i-closest vectors in the generated latent space to the selected row, average each dimension, and output a new augmented vector. At 205, the component 106 may be configured to determine a Wasserstein distance (e.g., a distance function defined between probability distributions on a given metric space) between each augmented vector and the original row. It should be noted that the lower the value of the Wasserstein distance, the closer the augmented vector is to the original row in the latent space dimensions.

For each augmented vector, the component 106 may determine a proportional sample weight using an inverse of relative Wasserstein distance values (e.g., augmented vectors closer to the original may have higher weights). The original row may now be augmented by five newly averaged vectors with appropriate sample weights.

At 206, the component 106 may be configured to set a sample weight for each original latent space vector that is outputted by the autoencoder 120 to one. At 207, the component 106 may be configured to append the augmented vectors and associated sample weights to the original latent space. The component 106 may then generate synthetic data using the augmented vectors as inputs, retaining the row-level sample weights on each row, with a sample weight of 1.0 for the original latent space vector row.

Figure 3:
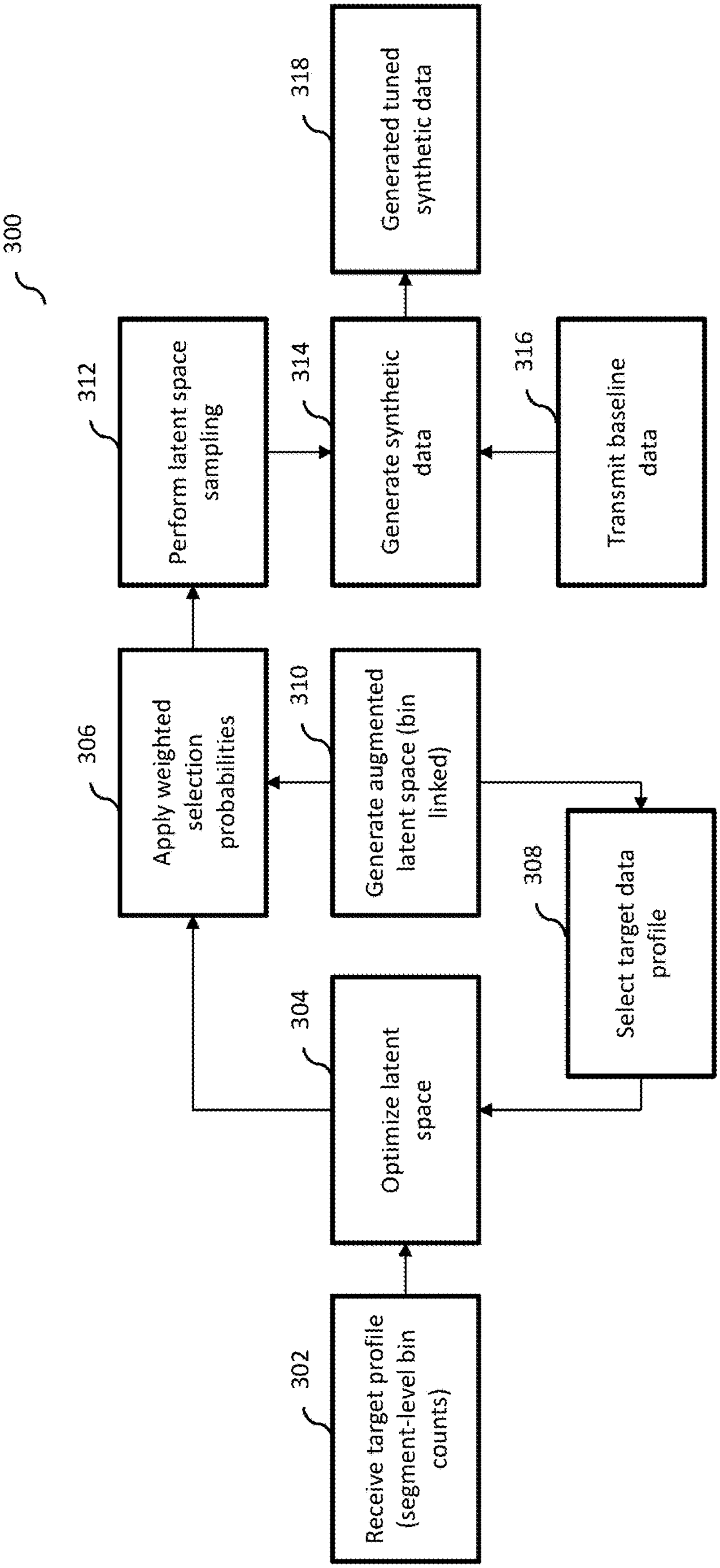
FIG. 3 illustrates an exemplary process for calibrating synthetic data, according to some implementations of the current subject matter

FIG. 3 illustrates an exemplary process 400 for calibrating synthetic data after the autoencoder 120 has completed the training process, according to some implementations of the current subject matter. The process 300 may be configured to be executed by the synthetic data calibration engine 113 to analyze profiles of target data (e.g., as available from the target profiles component 108) and determine whether there is a match between those profiles and the synthetic data that has been generated by the engine 113. Alternatively, or in addition to, the generated synthetic data may be calibrated to match one or more profiles of the target data as available from the baseline target profiles component 107 (as shown in FIG. 1).

Referring back to FIG. 3, at 302, one or more target data profiles that may be stored remotely from the engine 113 may be processed by the engine 113. For example, the engine 113 may be integrated in a remote computing system that may store target data profiles. Remote target profiles component 108 of the engine 113 may be configured to process and/or provide one or more such target data profiles.

The target profiles may be expressed as segment-level bin counts (e.g., binned counts of key variables in the target data profiles) associated with various data, such as for example, transactional data, time-series data, tradeline data, snapshot data, and/or any other data, and/or any combinations thereof. The target profile data may then be provided to the components of the engine 113 configured to perform refinement of data (e.g., using autoencoder 120, latent space augmentation component 106, and/or decoder 111), as discussed above.

As part of the data refinement, the engine 113 may be configured to optimize the latent space, at 304. Optimization of the latent space is discussed in connection with the process 200 shown in FIG. 2 and discussed above. Optimization of the latent space may be accomplished using Nelder-Mead method that searches for optimal row-level sample weights, at 306, that determine the probability of selecting each row in the augmented latent space (bin linked) 310, where the Nelder-Mead search may be used to find minimum of an objective function in a multidimensional space measuring the distance between target profiles and the profiles generated by process 310 that uses the decoder component 111 to generate remote profile-tuned synthetic data 112. As can be understood, any other optimization methods (e.g., FICO Xpress, as available from Fair Isaac Corporation, San Jose, California) may be used.

In some implementations, optimization of the latent space may be performed based on a selection of and/or using specific target data profiles. Alternatively or in addition to, all target data profiles that may exist (e.g., without being transmitted to the engine 113) may be selected for the purposes of augmentation. The target data profiles may be provided for optimization, at 308, which such target data profiles may be extracted from the augmented latent space (and/or may be bin-linked) that may have been generated by the engine 113 as part of its data calibration process.

At 306, the engine 113 may be configured to apply weighted selection of probabilities to the target data profiles received from the augmented latent space. The probabilities 306 may be used to perform latent space sampling, at 312, in a probability-weighted selection process that chooses rows from the augmented latent space (e.g., bin linked), at 310, to generate synthetic data, at 314, using the decoder component 111 that may closely match the structure of a remote data source, from which the remote target profiles 108 were derived. The result of this process is a set of generated tuned synthetic data 318.

At 312, the engine 113 may be configured to execute latent space sampling and then generate synthetic data, at 314. The synthetic data may be generated using the autoencoder component 120 (and/or decoder component 111). The synthetic data may also be generated in view of a baseline data that may be transmitted to the autoencoder 120, at 316. The autoencoder 120 may then be configured to perform comparison on the sampled synthetic data and baseline data to determine whether there is a match and generate a tuned synthetic data, at 318.

The current subject matter data calibration process may be useful in performing credit bureau profiling and/or scoring processes as well as performing consumer profiling (e.g., in financial, healthcare, insurance, etc. industries). The processes described herein may also be helpful in data aggregation instances, where various entities may be tasks with collecting data about other entities (e.g., consumers, companies, etc.) and performing analytics on such entities to determine, for instance, specific industry trends, associations, etc. Further, data calibration processes may be used by financial lenders to assess data relates to a specific consumer, and/or their entire lending portfolios to determine how certain changes (e.g., different input variables, etc.) may affect performance of such consumer and/or portfolios. Further, the synthetic data calibration processes may be used to determine behaviors of consumers in different geographical regions based on consumer behaviors in existing regions. For example, a company wishing to expand its operations into a different geographical region may wish to assess its hypothetical performance in that region based on its performance in the region(s) where it currently operates. The calibration process described herein may be used tune various factors associated with the company performance in one region to determine how it will fair in others.

Figure 4:
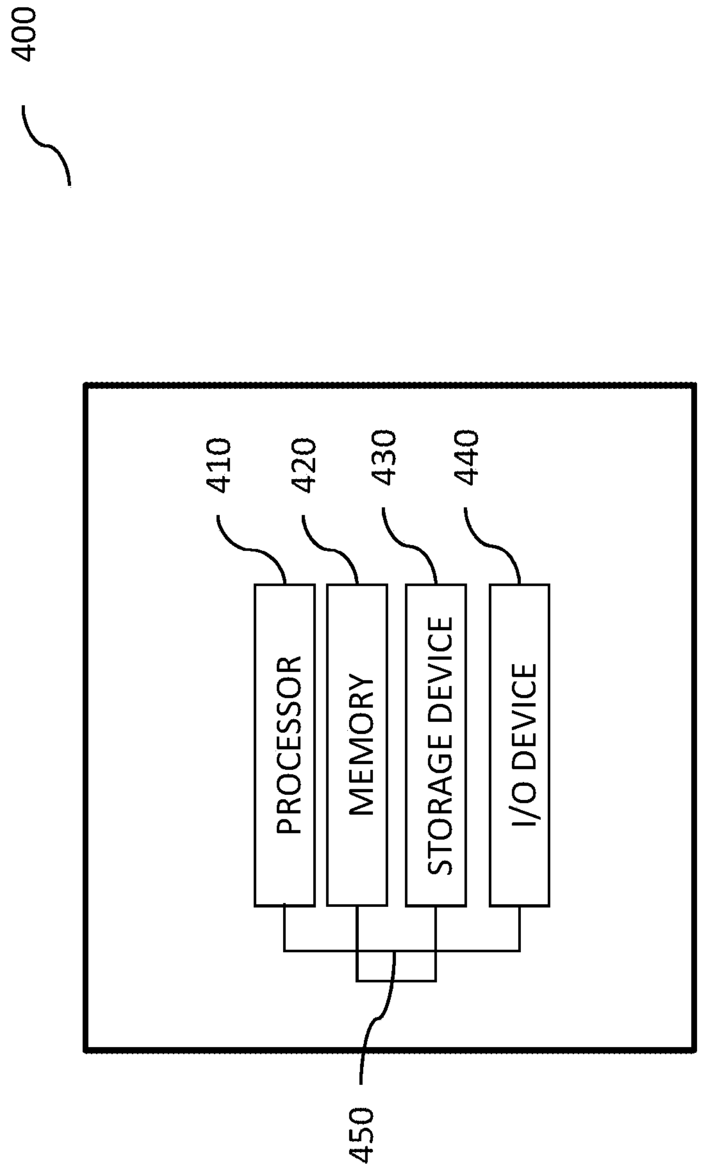
FIG. 4 illustrates an example of a system, according to some implementations of the current subject matter.

In some implementations, the current subject matter may be configured to be implemented in a system 400, as shown in FIG. 4. The system 400 may include a processor 410, a memory 420, a storage device 430, and an input/output device 440. Each of the components 410, 420, 430 and 440 may be interconnected using a system bus 450. The processor 410 may be configured to process instructions for execution within the system 400. In some implementations, the processor 410 may be a single-threaded processor. In alternate implementations, the processor 410 may be a multi-threaded processor. The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

Figure 5:
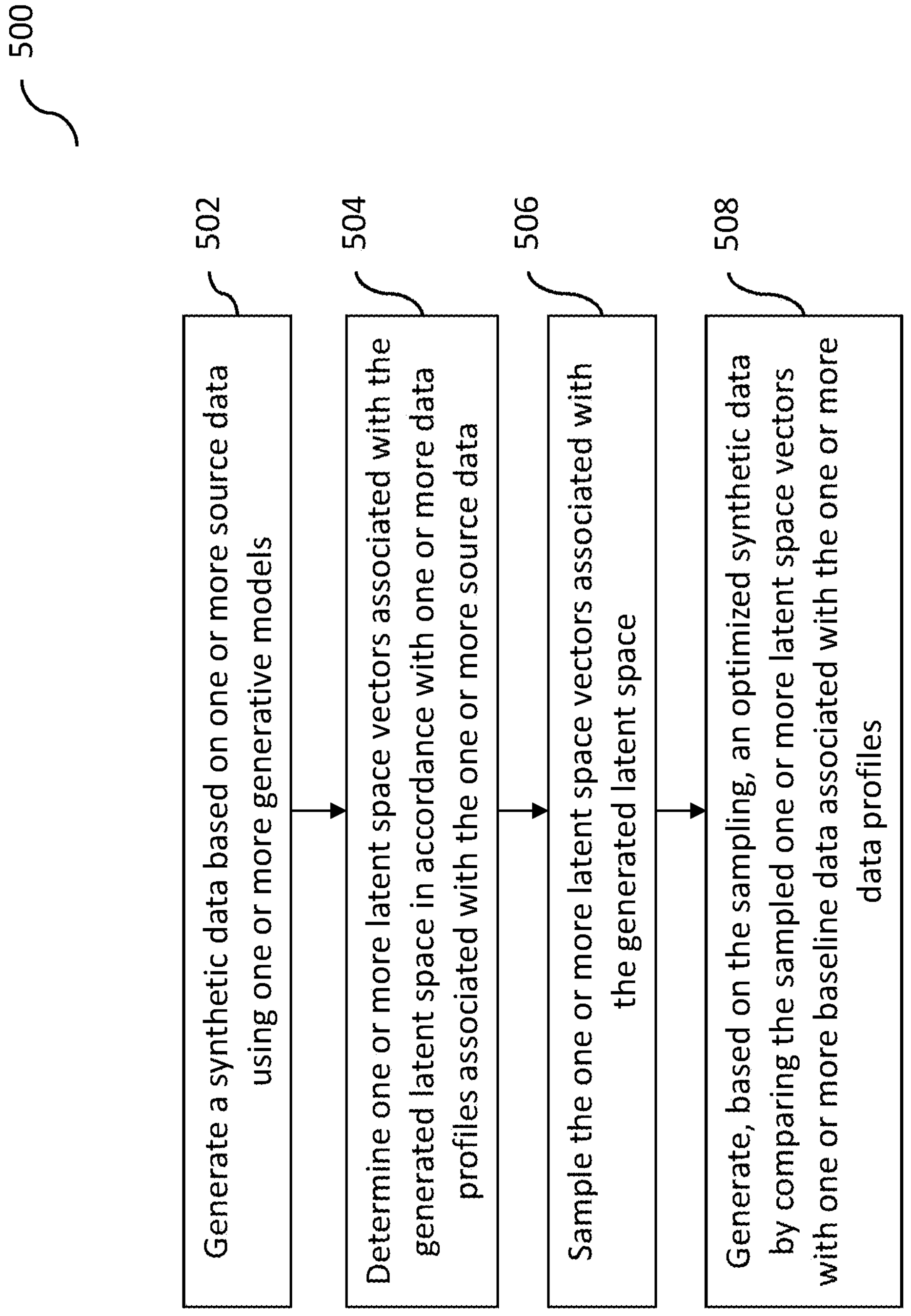
FIG. 5 illustrates an example of a method to generate calibrated synthetic data from remote profiles, according to some implementations of the current subject matter.

FIG. 5 illustrates an example of a method 500 for calibrating synthetic data, according to some implementations of the current subject matter. The method 500 may be performed by the system 100. For example, the process 500 may be executed using the engine 113 (as shown in FIG. 1), where the engine 113 may be any combination of hardware and/or software.

At 502, the engine 113 may generate a synthetic data based on one or more source data (e.g., data from one or more sources 102) using one or more generative models, e.g., autoencoder 120. The autoencoder 120 may be used to generate a latent space (e.g., the latent space 106) based on one or more source data.

At 504, the engine 113 may determine one or more latent space vectors associated with the generated latent space in accordance with one or more data profiles associated with one or more source data. The data profiles may be associated with the target data (e.g., as provided at 308 as shown in FIG. 3).

At 506, the engine 113 may sample one or more latent space vectors associated with the generated latent space (e.g., as shown at 310 in FIG. 3). At 508, the engine 113 may generate, based on the sampling, an optimized synthetic data (e.g., data 318) by comparing the sampled latent space vectors with one or more baseline data (e.g., data 316) associated with one or more data profiles.

In some implementations, the current subject matter can include one or more of the following optional features. The generative model may be an autoencoder (e.g., autoencoder 120 shown in FIG. 1). The optimized synthetic data may include one or more distributional properties associated with one or more data profiles. The optimized synthetic data may include one or more properties configured to match one or more properties of one or more source data.

In some implementations, the engine 113 may be configured to be located remotely from a storage location storing one or more source data (and/or at the same location).

In some implementations, the sampling may include sampling, using one or more data profiles, one or more latent space vectors associated with the generated latent space. One or more latent space vectors may be associated with one or more weighted selection probabilities. The sampling may be performed using one or more weighted selection probabilities.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
generating, using at least one processor, synthetic data based on one or more source data using one or more generative models, the one or more generative models being used to generate a latent space based on the one or more source data;
determining, using the at least one processor, one or more latent space vectors associated with the generated latent space in accordance with one or more data profiles associated with the one or more source data, wherein the one or more data profiles are indicative of one or more statistical properties of one or more variables of a target dataset in the one or more source data;
sampling, using the at least one processor, the one or more latent space vectors associated with the generated latent space based on the one or more data profiles in accordance with weighted selection probabilities associated with the one or more latent space vectors; and
generating, using the at least one processor, optimized synthetic data by comparing the sampled one or more latent space vectors with one or more baseline data associated with the one or more data profiles and calibrating the synthetic data responsive to distributional properties of the one or more data profiles, eliminating a need for transfer of the target dataset to a secondary storage location remote from a storage location of the one or more source data.

2. The method according to claim 1, wherein the one or more generative models is an autoencoder.

3. The method according to claim 1, wherein the optimized synthetic data includes one or more distributional properties associated with the one or more data profiles.

4. The method according to claim 1, wherein the optimized synthetic data includes one or more properties configured to match one or more properties of the one or more source data.

5. The method according to claim 1, wherein the one or more source data is not transmitted from a storage location storing the one or more source data to a remote location where the at least one processor is located for generating the synthetic data.

6. A system comprising:
at least one programmable processor; and
a non-transitory machine-readable medium storing instructions that, when executed by the at least one programmable processor, cause the at least one programmable processor to perform operations comprising:
generating, using at least one processor, synthetic data based on one or more source data using one or more generative models, the one or more generative models being used to generate a latent space based on the one or more source data;
determining, using the at least one processor, one or more latent space vectors associated with the generated latent space in accordance with one or more data profiles associated with the one or more source data, wherein the one or more data profiles are indicative of one or more statistical properties of one or more variables of a target dataset in the one or more source data;
sampling, using the at least one processor, the one or more latent space vectors associated with the generated latent space based on the one or more data profiles in accordance with weighted selection probabilities associated with the one or more latent space vectors; and
generating, using the at least one processor, optimized synthetic data by comparing the sampled one or more latent space vectors with one or more baseline data associated with the one or more data profiles and calibrating the synthetic data responsive to distributional properties of the one or more data profiles, eliminating a need for transfer of the target dataset to a secondary storage location remote from a storage location of the one or more source data.

7. The system according to claim 6, wherein the one or more generative models is an autoencoder.

8. The system according to claim 6, wherein the optimized synthetic data includes one or more distributional properties associated with the one or more data profiles.

9. The system according to claim 6, wherein the optimized synthetic data includes one or more properties configured to match one or more properties of the one or more source data.

10. The system according to claim 6, wherein the one or more source data is not transmitted from a storage location storing the one or more source data to a remote location where the at least one processor is located for generating the synthetic data.

11. A computer program product comprising a non-transitory machine-readable medium storing instructions that, when executed by at least one programmable processor, cause the at least one programmable processor to perform operations comprising:
generating, using at least one processor, synthetic data based on one or more source data using one or more generative models, the one or more generative models being used to generate a latent space based on the one or more source data;
determining, using the at least one processor, one or more latent space vectors associated with the generated latent space in accordance with one or more data profiles associated with the one or more source data, wherein the one or more data profiles are indicative of one or more statistical properties of one or more variables of a target dataset in the one or more source data;

sampling, using the at least one processor, the one or more latent space vectors associated with the generated latent space based on the one or more data profiles in accordance with weighted selection probabilities associated with the one or more latent space vectors; and generating, using the at least one processor, optimized synthetic data by comparing the sampled one or more latent space vectors with one or more baseline data associated with the one or more data profiles and calibrating the synthetic data responsive to distributional properties of the one or more data profiles, eliminating a need for transfer of the target dataset to a secondary storage location remote from a storage location of the one or more source data.

12. The computer program product according to claim 11, wherein the one or more generative models is an autoencoder.

13. The computer program product according to claim 11, wherein the optimized synthetic data includes one or more distributional properties associated with the one or more data profiles.

14. The computer program product according to claim 11, wherein the optimized synthetic data includes one or more properties configured to match one or more properties of the one or more source data.

15. The computer program product according to claim 11, wherein the one or more source data is not transmitted from a storage location storing the one or more source data to a remote location where the at least one processor is located for generating the synthetic data.

16. The method of claim 1, wherein the latent space is a reduced-dimension representation of original data in the target dataset and the weighted selection probabilities are determined based on a distribution distance between the one or more latent space vectors and the one or more data profiles.

17. The method of claim 1, wherein the sampling is based on finding a minimum of an objective function measuring a distance between a profile of the synthetic data and the target dataset in the one or more data profiles.

18. The system of claim 6, wherein the latent space is a reduced-dimension representation of original data in the target dataset and the weighted selection probabilities are determined based on a distribution distance between the one or more latent space vectors and the one or more data profiles.

19. The system of claim 6, wherein the sampling is based on finding a minimum of an objective function measuring a distance between a profile of the synthetic data and the target dataset in the one or more data profiles.

20. The computer program product of claim 11, wherein the latent space is a reduced-dimension representation of original data in the target dataset and the weighted selection probabilities are determined based on a distribution distance between the one or more latent space vectors and the one or more data profiles and wherein the sampling is based on finding a minimum of an objective function measuring a distance between a profile of the synthetic data and the target dataset in the one or more data profiles.

* * * * *